US012769573B2

(12) United States Patent
Khedkar

(10) Patent No.: US 12,769,573 B2
(45) Date of Patent: Oct. 20, 2026

(54) SYSTEM AND METHOD FOR SWITCHING TRAFFIC ROUTES BETWEEN AN APPLICATION AND AN UPDATED APPLICATION

(71) Applicant: Bank of America Corporation, Charlotte, NC (US)

(72) Inventor: Amol C. Khedkar, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 579 days.

(21) Appl. No.: 18/357,629

(22) Filed: Jul. 24, 2023

(65) Prior Publication Data

US 2025/0036440 A1 Jan. 30, 2025

(51) Int. Cl.
*G06F 9/455* (2018.01)

(52) U.S. Cl.
CPC .................... *G06F 9/45558* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,382,796 | B2 | 6/2008 | Haberman et al. |
| 9,009,822 | B1 | 4/2015 | Ismael et al. |
| 10,095,496 | B2 | 10/2018 | Winterfeldt et al. |
| 10,162,661 | B2 | 12/2018 | Farkas et al. |
| 10,579,367 | B2 | 3/2020 | Lander et al. |
| 11,042,446 | B2 | 6/2021 | Kumarasamy et al. |
| 11,223,546 | B2 | 1/2022 | Schibler et al. |
| 11,310,170 | B2 | 4/2022 | Cidon et al. |
| 11,397,609 | B2 | 7/2022 | Krishnamurthy et al. |
| 11,606,225 | B2 | 3/2023 | Cidon et al. |
| 2014/0052864 | A1 | 2/2014 | Van Der Linden et al. |
| 2015/0051823 | A1 | 2/2015 | Joglekar |

(Continued)

OTHER PUBLICATIONS

D. Ernst, A. Becker and S. Tai, “Rapid Canary Assessment Through Proxying and Two-Stage Load Balancing,” 2019 IEEE International Conference on Software Architecture Companion (ICSA-C), Hamburg, Germany, 2019, pp. 116-122 (Year: 2019).*

*Primary Examiner* — S. Sough
*Assistant Examiner* — Selena Sabah Nahra

(57) ABSTRACT

A system for switching traffic routes between an application and an updated application comprises a first webserver, a first global traffic management (GTM) server, and a second GTM server. The first virtual machine of the first webserver runs a first version of an application. The second virtual machine of the first webserver is configured to evaluate a second version of the application for deployment. The first GTM server routes a first traffic from a first communication equipment to the first virtual machine for accessing the first version. The second GTM server routes a second traffic from a second communication equipment to the second virtual machine for evaluating the second version. The first GTM server receives a notification from the first webserver that the second version passes an evaluation for deployment. The first GTM server routes the first traffic to the second virtual machine to access the second version.

20 Claims, 3 Drawing Sheets

(56) References Cited

U.S. PATENT DOCUMENTS

| | | | |
|---|---|---|---|
| 2016/0087835 A1 | 3/2016 | Mulligan et al. | |
| 2017/0149678 A1 | 5/2017 | Dumitrescu et al. | |
| 2017/0270007 A1 | 9/2017 | Huang et al. | |
| 2019/0146826 A1 | 5/2019 | Zou | |
| 2020/0210220 A1 | 7/2020 | Wilkinson et al. | |
| 2020/0259928 A1* | 8/2020 | Bonas | H04L 67/63 |
| 2021/0109734 A1* | 4/2021 | Vittal | G06F 11/1433 |
| 2021/0176304 A1* | 6/2021 | Muthiah | H04L 67/1014 |
| 2023/0061613 A1* | 3/2023 | Cardozo | G06F 8/71 |
| 2024/0264826 A1* | 8/2024 | Griffin | G06F 8/65 |

* cited by examiner

SYSTEM AND METHOD FOR SWITCHING TRAFFIC ROUTES BETWEEN AN APPLICATION AND AN UPDATED APPLICATION

TECHNICAL FIELD

The present disclosure relates generally to network communications and information security, and more specifically to a system and method for switching traffic routes between an application and an updated application.

BACKGROUND

An entity generally provides certain application services by allowing a user to access an application product running on a server through a communication equipment. The entity may need to update the application product for the user to access. However, an interaction between the communication equipment and the server may be paused or interrupted when the application product is updating on the server for the user to access.

SUMMARY

Current technology is not configured to provide a reliable and efficient solution to switch traffic routes between an application and an updated application. The system described in the present disclosure is particularly integrated into a practical application and provides technical solutions to seamlessly switch traffic routes between an application and an updated application.

In a conventional system, an entity or a service provider may provide certain application services by allowing a first user associated with a first communication equipment to access a first version of an application running on a production server to perform an interaction with the entity for an application service. A second user associated with a second communication equipment may evaluate development code of the application (e.g., a second version of the application) for deployment on a testing server. The second version of the application includes development code associated with corresponding updated application services. When the second version of the application passes an evaluation for deployment, the system may switch traffic routes between the first version of the application and the second version of the application for the first user to access the second version of the application to use the updated application service. However, promoting the second version of the application from the testing server to the production server for the first user to access may interrupt a user interaction with the entity or cause a service delay. The present system addresses this issue by using a webserver with at least two virtual machines, a first global traffic management (GTM) server, a second GTM server, and a pair of local traffic management (LTM) servers in each of two data centers. A first GTM server may route a first traffic from the first communication equipment associated with the first user to a first virtual machine of the webserver to access the first version of the application running on the first virtual machine. The second GTM server may route a second traffic from the second communication equipment associated with the second user to a second virtual machine of the webserver to evaluate the second version of the application for deployment. After the second version of the application passes an evaluation with the deployment on the second virtual machine, the first GTM server, alone or in conjunction with one or both LTM servers associated with the first data center, may route the first traffic to the second virtual machine for the first user to access the second version of the application to continue the interaction with the entity. The second GTM server, alone or in conjunction with one or both LTM servers associated with the first data center, may route the second traffic to the first virtual machine of the webserver for additional operations associated with application validation and deployment.

A system for switching traffic routes between an application and an updated application comprises the first webserver, the first global traffic management (GTM) server, the second GTM server, and the pair of local traffic management (LTM) servers in each of the two data centers. The first virtual machine runs a first version of an application. The second virtual machine is configured to evaluate a second version of the application for deployment. The first GTM server receives a first traffic from a first communication equipment to access a first version of an application. The second GTM server receives a second traffic from a second communication equipment to evaluate a second version of the application for deployment. The first GTM server, alone or in conjunction with one or both LTM servers associated with the first data center, routes the first traffic to the first virtual machine of the first webserver to access the first version of the application. The second GTM server, alone or in conjunction with one or both LTM servers associated with the first data center, routes the second traffic to the second virtual machine of the first webserver. The first GTM server and the second GTM server receive a notification from one or both of the LTM servers. The notification indicates that the second version of the application passes an evaluation for deployment on the second virtual machine. In response, the first GTM server, alone or in conjunction with one or both LTM servers associated with the first data center, routes the first traffic to the second virtual machine of the first webserver to access the second version of the application. The second GTM server, alone or in conjunction with one or both LTM servers associated with the first data center, routes the second traffic to the first virtual machine of the first webserver. In some embodiments, the notification is configured to simultaneously trigger the first GTM server to route the first traffic to the second virtual machine and trigger the second GTM server to route the second traffic to the first virtual machine.

The system described in the present disclosure provides technical solutions to solve the technical problems of the previous systems. The disclosed system provides a practical application that uses two GTM servers and multiple LTM servers to seamlessly switch a traffic route to access a first version of an application (e.g., production application) running on a first virtual machine to another traffic route to access a second version of the application deployed on a second virtual machine. This process provides a technical advantage that efficiently prevents interaction interruption and service delay during an interaction between a user and entity. As such, the disclosed system may provide technical advantages of improving the underlying operations by seamlessly and dynamically switching traffic routes between an application and an updated application in real time. In this way, after an updated version of the application passes an evaluation with deployment for production use, the corresponding traffic for an interaction between the communication equipment and a virtual machine of the webserver can be seamlessly switched to the updated version of the application. A user may not be aware of a traffic route switch that occurs during the interaction with the entity. Further, the disclosed system may use two GTM servers and multiple LTM servers to seamlessly switch traffic routes between an application and an updated application, the disclosed system may use two GTM servers and multiple LTM servers to seamlessly switch traffic routes between the application and the updated application which may respectively run and be evaluated for deployment on different virtual machines of different webservers in a data center. In some embodiments, the disclosed system may use two GTM servers and multiple LTM servers to seamlessly switch traffic routes associated with corresponding virtual machines of a first data center to other virtual machines in a second data center. Thus, the user may not notice that the traffic route for accessing the first version of the application is switched to the second version of the application during an interaction with an entity even though a webserver or a data center has lost a network connectivity with a network. In addition, the disclosed system may provide an efficient usage of network resources by using two GTM servers, multiple LTM servers, and a webserver with two virtual machines to implement traffic route switching between an application and an updated application.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide efficient and reliable solutions to switch traffic routes between an application and an updated application. This disclosure presents a system and method for seamlessly switching traffic routes between an application and an updated application by referring to FIGS. 1-3.

Figure 1:
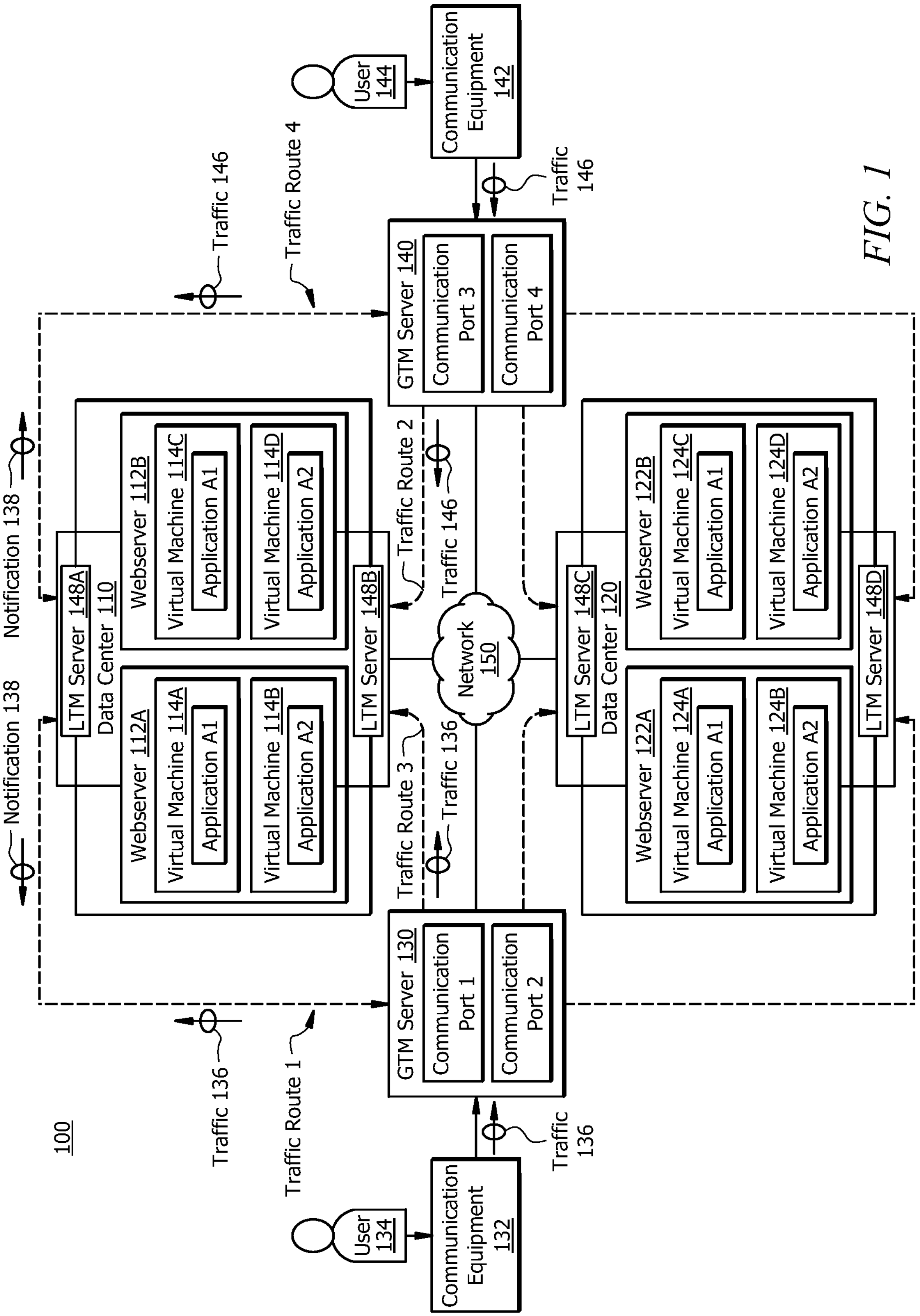
FIG. 1 illustrates an embodiment of a system configured to switch traffic routes between an application and an updated application.

Example System for Switching Traffic Routes Between an Application and an Updated Application FIG. 1 illustrates one embodiment of a system 100 that is configured to switch traffic routes between an application (e.g., a first version of an application A1) and an updated application (e.g., a second version of the application A2) in a network 150. In one embodiment, system 100 comprises a first data center 110, a second data center 120, a first global traffic management (GTM) server 130, a second GTM server 140, a first communication equipment 132, a second communication equipment 142, a first local traffic management (LTM) server 148A associated with first data center 110, a second local traffic management (LTM) server 148B associated with first data center 110, a third local traffic management (LTM) server 148C, associated with second data center 120, a fourth local traffic management (LTM) server 148D associated with second data center 120, and network 150. The network 150 enables communications between components of the system 100. The first data center 110 includes a first webserver 112A and a second webserver 112B. The first webserver 112A includes a first virtual machine 114A and a second virtual machine 114B. The second webserver 112B includes a third virtual machine 114C and a fourth virtual machine 114D. The first data center 110 and the second data center 120 may be backup data centers that include the same network components, network applications, and data storages associated with an entity for certain application services. For example, the first GTM server 130 may automatically route network traffic associated with the first data center 110 to the second data center 120 when detecting the first data center 110 has lost a network connectivity. In other embodiments, system 100 may not have all the components listed and/or may have other elements instead of, or in addition to, those listed above.

In some embodiments, an entity or a service provider may need to switch traffic routes between a first version of an application A1 and a second version of the application A2 for users to use updated application services associated with the second version of the application A2 during interactions between the users and the entity. For example, a first GTM server 130 may route a first traffic 136 from a first communication equipment 132 to a first virtual machine 114A of a first webserver 112A to access a first version of an application A1 running on the first virtual machine 114A. The second GTM server 140 may route a second traffic 146 to a second virtual machine 114B of the first webserver 112A to evaluate a second version of the application A2 for deployment on the second virtual machine 114B. In a particular embodiment, the second version of the application A2 may be a beta version of software that is undergoing development and/or testing. After determining that the second version of the application A2 passes an evaluation for deployment on the second virtual machine 114B, the first GTM server 130, alone or in conjunction with one or both of LTM servers 148A and 148B, may route the first traffic 136 from the first communication equipment 132 to access the second version of the application A2 deployed on the second virtual machine 114B. Accordingly, the second GTM server 140, alone or in conjunction with one or both of LTM servers 148A and 148B, may route the second traffic 146 from the second communication equipment 142 to the first virtual machine 114A for additional operations associated with application validation and deployment.

System Components

Network

Network 150 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 150 may be configured to support any suitable type of communication protocol as would be appreciated by one of ordinary skill in the art.

Communication Equipment

As illustrated in FIG. 1, a communication equipment such as a first communication equipment 132 associated with a first user 134 is generally any device which may communicate with a plurality of webservers, a first GTM server 130, and a second GTM server 140 in the network 150. The plurality of the webservers are located in one or more data centers 110 and 120. Examples of the communication equipment 132 include, but are not limited to, a personal computer, a desktop computer, a workstation, a server, a laptop, a tablet computer, a mobile phone (such as a smartphone), etc. The communication equipment 132 may include a user interface, such as a display, a microphone, keypad, or other appropriate terminal equipment usable by a first user 134. The communication equipment 132 may include a hardware processor, memory, and/or circuitry configured to perform any of the functions or actions of the communication equipment 132 described herein. The hardware processor may include one or more processors operably coupled to the memory. The one or more processors may be any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The one or more processors may be a programmable logic device, a microcontroller, a microprocessor, or any suitable combination of the preceding. The one or more processors are configured to process data and may be implemented in hardware or software. For example, the processor may be 8-bit, 16-bit, 32-bit, 64-bit, or of any other suitable architecture. The processor may include an arithmetic logic unit (ALU) for performing arithmetic and logic operations for performing the functions of the communication equipment 132.

Data Center

The system 100 may include at least a first data center 110 and a second data center 120 which are managed by an entity to provide certain application services. The first data center 110 and the second data center 120 may be backup data centers which include the same network components, network applications, and data storages associated with the entity for certain application services. For example, the second data center 120 may include duplicate system structure of the first data center 110. The first data center 110 and the second data center 120 may store the same software instructions and data for the entity to provide corresponding application services. After the first GTM server 130 and the second GTM server 140 detect that the first data center 110 has lost a network connectivity, the first GTM server 130 and the second GTM server 140 may automatically route network traffic associated with the first data center 110 to the second data center 120. Each data center may include a plurality of webservers. For example, the first data center 110 may include a first webserver 112A and a second webserver 112B. The second data center 120 may include a third webserver 122A and a fourth webserver 122B.

Server

In some embodiments, the system 100 may include a plurality of servers to implement operations of switching traffic routes between an application and an updated application. The plurality of the servers may include a first global traffic management (GTM) server 130, a second GTM server 140, and a plurality of LTM servers 148A-D which are located in one or more data centers 110 and 120.

Each webserver, GTM server, or LTM server is generally a server, or any other computing device configured to process data and communicate with communication equipment 132 and 142 via the network 150. Each GTM server 130 and 140 may communicate with a plurality of communication equipment 132 and 142 to receive traffic from users to interact with an entity for certain application services. With respect to data center 110, each GTM server 130 and 140 may communicate with each webserver 112A-B to identify corresponding applications running on the webserver 112A-B in a data center 110. Each GTM server 130 and 140, alone or in conjunction with one or both LTM servers 148A-B of data center 110, may route the traffic from the plurality of the communication equipment 132 and 142 through corresponding communication ports to corresponding webservers 112A-112B for users to access the corresponding applications to complete corresponding application services provided by the entity. Similar operations may be performed with respect to data center 120, as appropriate.

Figure 2:
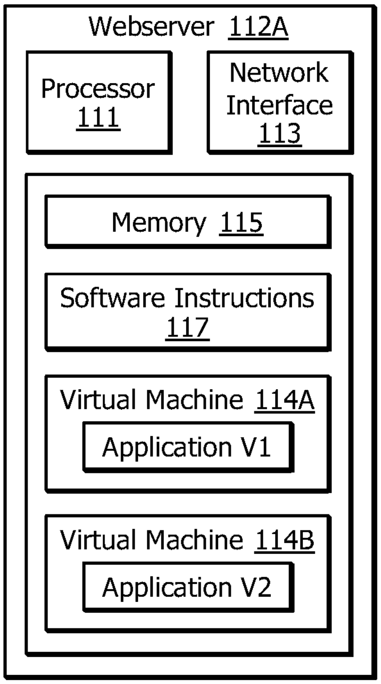
FIG. 2 illustrates is a block diagram of an example webserver of the system of FIG. 1.

FIG. 2 is a diagram of an example webserver such as, for example, the webserver 112A which may be located in the first data center 110. Although this description is detailed with respect to webserver 112A, it should be understood that the description of the webserver in conjunction with FIG. 2 applies to any webserver, including webservers 112B, 122A, and/or webserver 122B. Processor 111 includes one or more processors operably coupled to the memory 115. The processor 111 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 111 may be a programmable logic device, a microcontroller, a microprocessor, or any suitable combination of the preceding. The one or more processors are configured to process data and may be implemented in hardware or software. For example, the processor 111 may be 8-bit, 16-bit, 32-bit, 64-bit, or of any other suitable architecture. The processor 111 may include an arithmetic logic unit (ALU) for performing arithmetic and logic operations. The processor 111 registers the supply operands to the ALU and stores the results of ALU operations, and a control unit that fetches instructions from the memory 115 and executes them by directing the coordinated operations of the ALU, registers and other components. The one or more processors are configured to implement various instructions. For example, the one or more processors are configured to execute instructions (e.g., software instructions 117) to perform the operations as described in FIG. 1 and FIG. 3. In this way, the processor 111 may be a special-purpose computer designed to implement the functions disclosed herein. In one embodiment, the processor 111 is implemented using logic units, FPGAs, ASICs, DSPs, or any other suitable hardware. The processor 111 is configured to operate to perform one or more operations as described in FIG. 3.

Network interface 113 is configured to enable wired and/or wireless communications (e.g., via network 150). The network interface 113 is configured to communicate data between the first webserver 112A and a plurality of communication equipment, databases, systems, or domains. For example, the network interface 113 may comprise a WIFI interface, a local area network (LAN) interface, a wide area network (WAN) interface, a modem, a switch, or a router. The processor 111 is configured to send and receive data using the network interface 113. The network interface 113 may be configured to use any suitable type of communication protocol as would be appreciated by one of ordinary skill in the art.

Memory 115 may be volatile or non-volatile and may comprise a read-only memory (ROM), random-access memory (RAM), ternary content-addressable memory (TCAM), dynamic random-access memory (DRAM), and static random-access memory (SRAM). Memory 115 may be a non-transitory computer-readable medium implemented using one or more disks, tape drives, solid-state drives, and/or the like. Memory 115 is operable to store the software instructions 117, a user interface application, and other program modules to implement operational flows of the system of FIG. 1. The software instructions 117 may store any suitable set of instructions, logic, rules, or code operable to be executed by the processor 111 to implement the processes and embodiments described below.

The first webserver 112A may be a host server and configured to communicate with a plurality of virtual machines and global traffic management servers in the system 100. The first webserver 112A may be a server implemented in the cloud and may also be organized in a distributed manner. The first webserver 112A may include a plurality of virtual machines, such as a first virtual machine 114A and a second virtual machine 114B. For example, a first webserver 112A is generally configured to manage operations of a first virtual machine 114A and a second virtual machine 114B as described further below in conjunction with the operational flows of the method 300 described in FIG. 3. Each virtual machine of the first webserver 112A may be a software implementation of a computing device. Each virtual machine may emulate a hardware computer system in an operating system of a physical webserver to enable applications to implement certain application services provided by the entity. In some embodiment, a virtual machine may emulate a hardware computer system to execute corresponding software instructions to run a software program such as a first version of an application to facilitate implementation of certain application services between users and the entity. In some embodiment, a virtual machine may emulate a hardware computer system to execute corresponding software instructions to evaluate an updated version of the application for deployment. Each virtual machine may include a virtual operating system and associated virtual resources, such as virtual processor, virtual memory, virtual operating system in communication with the processor 111 of the first webserver 112A to execute applications to facilitate seamless traffic route switch between a first version of an application A1 and the second version of an application A2.

Route a First Traffic from a First Communication Equipment to a First Virtual Machine In some embodiments, a first GTM server 130 may receive a first traffic 136 indicative of a first request from the first communication equipment 132 associated with a first user 134. The first user 134 may access an application and have an interaction with an entity for a particular application service. The first GTM server 130 may communicate with the first webserver 112A and identify that a first version of the application A1 runs on a first virtual machine 114A of the first webserver 112A. The first version of the application A1 includes application production code which may be executed by the first virtual machine 114A to provide the particular application service to users. The first GTM server 130 may route the first traffic 136 from the first communication equipment 132 to the first virtual machine 114A through a first communication port 1 of the first GTM server 130. The first user 134 may access the first version of the application A1 through the first communication equipment 132 via a first traffic route 1 to have an interaction with the entity for the particular application service.

Route a Second Traffic from a Second Communication Equipment to a Second Virtual Machine The entity may update the first version of the application A1 to a second version of the application A2 which includes new functions or features associated with the particular application service. For example, the second version of the application A2 may include application development code stored in a second virtual machine 114B. The application development code of the second version of the application A2 may be evaluated before being prompted for deployment on the second virtual machine 114B of the first webserver 112A. In some embodiments, a second GTM server 140 may receive a second traffic 146 from a second communication equipment 142 associated with a second user 144 to evaluate a second version of the application A2 for deployment. The second GTM server 140 may route the second traffic 146 from the second communication equipment 142 via a second traffic route 2 to the second virtual machine 114B of the first webserver 112A through a third communication port 3 of the second GTM server 140.

Switch Traffic Routes Between an Application and an Updated Application

After the second version of the application A2 passes an evaluation with the deployment on the second virtual machine 114B, one or both of LTM servers 148A and 148B may send a notification 138 to the first GTM server 130 and to the second GTM server 140. The notification 138 may indicate that the second version of the application A2 is ready for use. The notification 138 may be a message configured to simultaneously trigger the first GTM server 130 to route the first traffic 136 to the second virtual machine 114B and trigger the second GTM server 140 to route the second traffic 146 to the first virtual machine 114A.

In response to receiving the notification 138, the first GTM server 130, either alone or in conjunction with one or both of LTM servers 148A and 148B, may route the first traffic 136 to the second virtual machine 114B of the first webserver 112A through a third traffic route 3 via a second communication port 2 of the first GTM server 130. The first user 134 may access the second version of the application A2 through the first communication equipment 132 to continue the interaction with the entity for the particular application service through the third traffic route 3 via the second communication port 2. Meanwhile, in response to receiving the notification 138, the second GTM server 140, either alone or in conjunction with one or both of LTM servers 148A and 148B may route the second traffic 146 to the first virtual machine 114A of the first webserver 112A through a fourth traffic route 4 via a fourth communication port 4 of the second GTM server 140 for additional operations associated with application validation and deployment.

The first GTM server 130 and the second GTM server 140 may therefore perform seamless traffic route switch between a first version of an application A1 and a second version of the application A2 between the first virtual machine 114A and the second virtual machine 114B of the first webserver 112A. The first user 134 may access the second version of the application A2 through the first communication equipment 132 without needing to be aware of the traffic route switch that occurs during the interaction between the user and the entity.

In some embodiments, the entity may store a third version of the application on the first virtual machine 114A for evaluation and deployment. The second user 144 may further access the first virtual machine 114A of the first webserver 112A through the fourth traffic route 4 to evaluate the third version of the application for deployment. After the third version of the application passes an evaluation with the deployment on the first virtual machine 114A, one or both of LTM servers 148A and 148B may send a new notification 138 to the first GTM server 130 and the second GTM server 140 to trigger a new traffic route switch between the second version of the application and the third version of the application in a similar manner as described above. The new notification 138 may be configured to simultaneously trigger the first GTM server 130 to route the first traffic from the second virtual machine 114B to the first virtual machine 114A to access the third version of the application. The new notification 138 may be configured to simultaneously trigger the second GTM server 140 to route the second traffic 146 to from the first virtual machine 114A to the second virtual machine 114B for additional operations associated with application validation and deployment. The first virtual machine 114A and the second virtual machine 114B may alternatively operate with the first GTM server 130 and the second GTM server 140 to perform a seamless switch between an application and an updated application.

In some embodiments, the first GTM server 130 and the second GTM server 140 may perform a traffic route switch between an application and an updated application associated with the third virtual machine 114C and the fourth virtual machine 114D of the second webserver 112B in the first data center 110, either alone or in conjunction with one or both of LTM servers 148C and 148D, in a similar manner to that described above.

Switch Traffic Routes Between an Application and an Updated Application from a First Data Center to a Second Data Center In some embodiments, the first data center 110 and the second data center 120 may operate to provide backup operations to users. Network traffic and different versions of an application in a first data center 110 may be duplicated in a second data center 120. The first data center 110 and the second data center 120 may include the same updates to the application on corresponding virtual machines. Both data centers provide traffic routes for users to access the corresponding version application to perform interactions with the entity or evaluate an updated application for deployment. For example, the second data center 120 may store the first version of the application A1 running on the virtual machine 124A of the third webserver 122A. The first user 134 may access the first version of the application A1 to interact with the entity for a particular application service. The second data center 120 may store the second version of the application A2 on the virtual machine 124B of the third webserver 122A for a second user 144 to evaluate for deployment.

In some embodiments, the first GTM server 130 and the second GTM server 140 may detect a network connectivity failure with the first data center 110. The first GTM server 130 may route the first traffic 136 from the first communication equipment 132 to the virtual machine 124A of the third webserver 122A in the second data center 120. The first user 134 may continue an interaction with the entity to implement the particular application service. The second GTM server 140 may route the second traffic 146 from the second communication equipment 142 to the virtual machine 124B of the third webserver 122A in the second data center 120. The second user 144 may continue an interaction with the entity through the second communication equipment 142 to evaluate the second version of the application A2 for deployment. After the second version of the application A2 passes an evaluation with the deployment on the virtual machine 124B, one or both of LTM servers 148C and 148D may send a corresponding notification signal 138 to the first GTM server 130 and the second GTM server 140. The corresponding notification signal 138 may be a message configured to trigger the first GTM server 130 to route the first traffic 136 to the virtual machine 124A. The notification signal 138 may further trigger the second GTM server 140 to route the second traffic 146 to the virtual machine 124B. The first GTM server 130 and the second GTM server 140, either alone or in conjunction with one or both of LTM servers 148C and 148D, may perform a seamless traffic route switch between an application and an updated application in the second data center 120 in a similar manner to that described above and in conjunction with FIG. 3.

Figure 3:
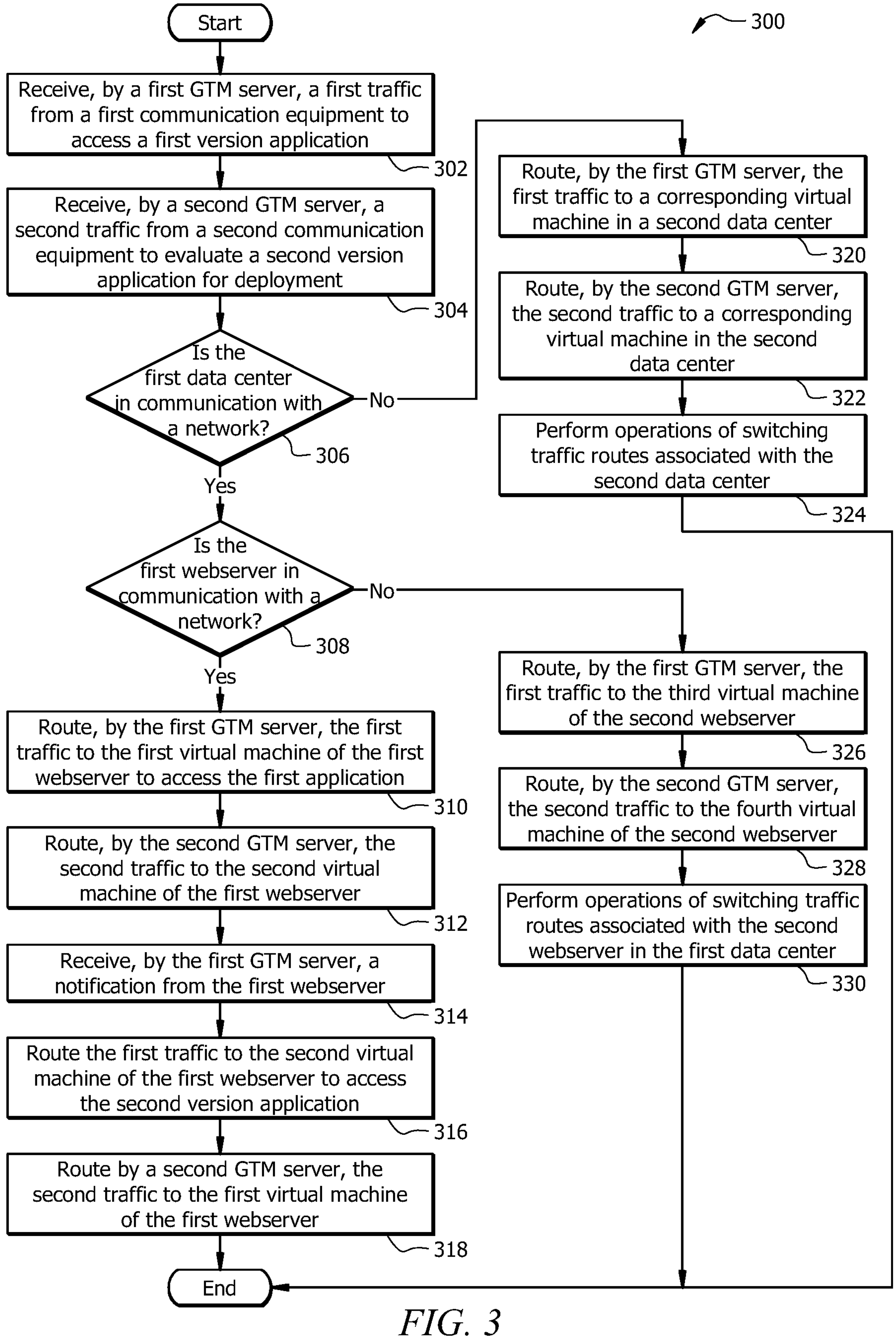
FIG. 3 illustrates an example operational flow of a method for switching traffic routes between the application and the updated application.

Example Operational Flow for Switching Traffic Routes Between an Application and an Updated Application FIG. 3 illustrates an example flow of a method 300 for switching traffic routes between an application and an updated application in the system 100. Modifications, additions, or omissions may be made to method 300. Method 300 may include more, fewer, or other operations. For example, operations may be performed by a first GTM server 130, a second GTM server 140, LTM servers 148A-D, corresponding webservers 112 and virtual machines 114 located in a first data center 110 and/or a second data center 120, or components of any of thereof performing operations, any suitable system or components of the system may perform one or more operations of the method 300. For example, one or more operations of method 300 may be implemented, at least in part, by a first GTM server 130, a second GTM server 140, and LTM servers 148A-D to perform operations 302-330.

The method 300 begins at operation 302 where the first GTM server 130 may receive a first traffic 136 from a first communication equipment 132 to access a first version of an application A1. The first version of the application A1 may run on a first virtual machine 114A of a first webserver 112A.

At operation 304, a second GTM server 140 may receive a second traffic 146 from a second communication equipment 142 to evaluate a second version of the application A2 for deployment. The second version of the application A2 may be stored on a first virtual machine 114A of the first webserver 112A.

At operation 306, the first GTM server 130 may determine whether the first data center 110 is in communication with a network 150. In response to determining that the first data center 110 is not in communication with the network 150, operations 320-324 may be performed as described below.

At operation 308, in response to determining that the first data center 110 is in communication with the network 150, the first GTM server 130 may determine whether the first webserver 112A of the first data center 110 is in communication with the network 150. In response to determining that the first webserver 112A in the first data center 110 is not in communication with the network 150, operations 326-330 may be performed as described below.

In some embodiments, the second GTM server 140 may also or alternatively determine whether the first data center 110 is in communication with the network 150. In response to determining that the first data center 110 is not in communication with the network 150, the second GTM server 140 may also or alternatively determine whether the first webserver 112A in the first data center 110 is in communication with the network 150.

At operation 310, in response to determining that the first webserver 112A of the first data center 110 is in communication with the network 150, the first GTM server 130, alone or in conjunction with one or both of LTM servers 148A and 148B, may route the first traffic 136 associated with the first communication equipment 132 to the first virtual machine 114A of the first webserver 112A for the first user 134 to access the first version of the application A1 to interact with the entity.

At operation 312, in response to determining that the first webserver 112A in the first data center 110 is in communication with the network 150, the second GTM server 140, alone or in conjunction with one or both of LTM servers 148A and 148B, may route the second traffic 146 associated with the second communication equipment 142 to the second virtual machine 114B of the first webserver 112A. The second virtual machine 114B may be configured to evaluate the second version of the application A2 for a deployment.

At operation 314, the first GTM server 130 may receive a notification signal 138. The notification signal 138 may indicate that the second version of the application A2 passes an evaluation with the deployment on the second virtual machine 114B. For example, the notification signal 138 may be sent simultaneously to the first GTM server 130 and the second GTM server 140. The notification signal 138 may be configured to trigger the first GTM server 130 to route the first traffic 136 to the second virtual machine 114B and trigger the second GTM server 140 to route the second traffic 146 to the second virtual machine 114B.

At operation 316, in response to receiving the notification signal 138, the first GTM server 130, alone or in conjunction with one or both of LTM servers 148A and 148B, may route the first traffic 136 to the second virtual machine 114B of the first webserver 112A for the first user 134 to access the second version of the application A2.

At operation 318, in response to receiving the notification signal 138, the second GTM server 140, alone or in conjunction with one or both of LTM servers 148A and 148B, may route the second traffic 146 to the first virtual machine 114A of the first webserver 112A for additional operations associated with application validation and deployment.

Referring back to operation 306, in response to determining that the first data center 110 is not in communication with the network 150, the method 300 may proceed to operations 320-324. The first GTM server 130 and the second GTM server 140 may route traffic from corresponding communication equipment 132 and 142 to the second data center 120. For example, the first GTM server 130 and the second GTM server 140 may automatically route network traffic associated with the first data center 110 to the second data center 120 after detecting the first data center 110 has lost network connectivity. The second data center 120 may include a third webserver 122A and a fourth webserver 122B. The third webserver 122A in the second data center 120 may include virtual machines 124A and 124B.

At operation 320, the first GTM server 130, alone or in conjunction with one or both of LTM servers 148C and 148D, may route the first traffic 136 to a corresponding virtual machine 124A of the third webserver 122A in the second data center 120. The first version of the application A1 may be stored on the virtual machine 124A. The first user 134 may access the virtual machine 124A of the third webserver 122A through the first communication equipment 132 to continue an interaction with the entity.

At operation 322, the second GTM server 140, alone or in conjunction with one or both of LTM servers 148C and 148D, may route the second traffic 146 to a corresponding virtual machine 124B of the third webserver 122A in the second data center 120. The second version of the application A2 may be stored on the virtual machine 124B. The second user 144 may access the virtual machine 124B to continue an interaction with the entity to evaluate the second version of the application A2 for deployment.

At operation 324, the first GTM server 130 and the second GTM server 140, alone or in conjunction with one or both of LTM servers 148C and 148D, may perform operations of switching traffic routes associated with corresponding virtual machines 124A and 124B in the second data center 120. For example, the virtual machines 124A and 124B may be configured to communicate with the first GTM server 130 and the second GTM server 140 to perform similar operations 310-318 which are associated with the first virtual machine 114A and the second virtual machine 114B of the first webserver 112A. Similarly, the fourth webserver 122B in the second data center 120 may include virtual machines 124C and 124D. The first GTM server 130 and the second GTM server 140 may communicate with the virtual machines 124C and 124D to perform similar operations 310-318 to implement seamless traffic route switch as described above.

Referring back to operation 308, when the first GTM server 130 and the second GTM server 140 detect that the first webserver 112A is not in communication with the network 150, the method 300 may proceed to operations 326-330.

At operation 326, the first GTM server 130, alone or in conjunction with one or both of LTM servers 148A and 148B, may route the first traffic 136 associated with the first communication equipment 132 to the third virtual machine 114C of the second webserver 112B through the first traffic route 1 via the first communication port 1. The first version of the application A1 may be stored on the third virtual machine 114C. The first user 134 may access the third virtual machine 114C of the second webserver 112B through the first communication equipment 132 for the first user to continue an interaction with the entity.

At operation 328, the second GTM server 140, alone or in conjunction with one or both of LTM servers 148A and 148B, may route the second traffic 146 from the second communication equipment 142 via the second traffic route 2 to the fourth virtual machine 114D of the second webserver 112B through the third communication port 3. The second version of the application A2 may be stored on the fourth virtual machine 114D. The second user 144 may access the fourth virtual machine 114D to continue an interaction with the entity to evaluate the second version of the application A2 for deployment.

At operation 330, the first GTM server 130 and the second GTM server 140 may perform operations of switching traffic routes associated with the second webserver 112B in the first data center 110. The second webserver 112B may include the third virtual machines 114C and the fourth virtual machine 114D. The first GTM server 130 and the second GTM server 140 may communicate with the third virtual machines 114C and the fourth virtual machine 114D to perform similar operations 310-318 to implement seamless traffic route switch as described above.

The disclosed system is integrated into a practical application which may prevent interaction interruption and service delay during an interaction between a first communication equipment associated with the first user and a webserver by seamlessly switching traffic routes between an application and an updated application.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a first webserver comprising a first virtual machine and a second virtual machine, wherein the first virtual machine runs a first version of an application, and the second virtual machine is configured to evaluate a second version of the application for deployment;

a first global traffic management (GTM) hardware server in communication with the first webserver; and a second GTM hardware server in communication with the first webserver;

wherein the first GTM hardware server is configured to:

receive, from a first communication equipment, a first traffic indicating a first request to access the first version of the application;

route the first traffic to the first virtual machine of the first webserver to access the first version of the application;

receive a notification from the first webserver that the second version of the application passes an evaluation for deployment on the second virtual machine; and in response, route the first traffic to the second virtual machine of the first webserver to access the second version of the application;

wherein the second GTM hardware server is configured to:

receive, from a second communication equipment, a second traffic indicating a second request to access the first webserver to evaluate the second version of the application;

route the second traffic to the second virtual machine of the first webserver;

receive the notification from the first webserver that the second version of the application passes the evaluation for deployment on the second virtual machine; and in response, route the second traffic to the first virtual machine of the first webserver.

2. The system of claim 1, wherein the notification is configured to simultaneously trigger the first GTM hardware server to route the first traffic to the second virtual machine and trigger the second GTM hardware server to route the second traffic to the first virtual machine.

3. The system of claim 2, further comprising a second webserver which comprises a third virtual machine and a fourth virtual machine;

wherein the third virtual machine is configured to run the first version of the application; and wherein the fourth virtual machine is configured to evaluate the second version of the application.

4. The system of claim 3, wherein the first GTM hardware server is further configured to:

determine whether the first webserver is in communication with a network; and in response to determining that the first webserver is not in communication with the network, route the first traffic to the third virtual machine of the second webserver to access the first version of the application.

5. The system of claim 3, wherein the second GTM hardware server is configured to:

determine whether the first webserver is in communication with a network; and in response to determining that the first webserver is not in communication with the network, route the second traffic to the fourth virtual machine of the second webserver to evaluate the second version of the application for deployment.

6. The system of claim 1, wherein the first webserver and a second webserver are located in a first data center; and wherein the system further comprises a second data center which comprises a third webserver and a fourth webserver.

7. The system of claim 6, wherein the first GTM hardware server is further configured to:

determine whether the first data center is in communication with a network;

in response to determining that the first data center is not in communication with the network, route the first traffic to a corresponding webserver in the second data center;

wherein the second GTM hardware server is further configured to:

determine whether the first data center is in communication with the network; and in response to determining that the first data center is not in communication with the network, route the second traffic to a corresponding webserver in the second data center.

8. A method comprising:

receiving, by a first global traffic management (GTM) server, a first traffic from a first communication equipment to access a first version of an application, wherein the first version of the application runs in a first virtual machine of a first webserver;

receiving, by a second GTM server, a second traffic from a second communication equipment to evaluate a second version of the application for deployment, wherein the second version of the application is stored in a second virtual machine of the first webserver;

routing, by the first GTM server, the first traffic associated with the first communication equipment to the first virtual machine of the first webserver to access the first version of the application;

routing, by the second GTM server, the second traffic to the second virtual machine of the first webserver, wherein the second virtual machine is configured to evaluate the second version of the application for a deployment;

receiving, by the first GTM server, a notification from the first webserver, the notification indicating that the second version of the application passes an evaluation with the deployment on the second virtual machine;

routing, by the first GTM server, the first traffic associated with the first communication equipment to the second virtual machine of the first webserver to access the second version of the application; and routing, by the second GTM server, the second traffic to the first virtual machine of the first webserver.

9. The method of claim 8, wherein the notification is configured to simultaneously trigger the first GTM server to route the first traffic to the second virtual machine and trigger the second GTM server to route the second traffic to the first virtual machine.

10. The method of claim 9, wherein the first webserver is located in a first data center, the first data center further comprising a second webserver;

wherein the second webserver comprises a third virtual machine and a fourth virtual machine;

wherein the third virtual machine is configured to run the first version of the application; and wherein the fourth virtual machine is configured to evaluate the second version of the application.

11. The method of claim 10, further comprising:

determining, by the first GTM server, whether the first webserver is in communication with a network; and in response to determining that the first webserver is not in communication with the network, routing the first traffic to the third virtual machine of the second webserver to access the first version of the application.

12. The method of claim 10, further comprising:

determining, by the second GTM server, whether the first webserver is in communication with a network; and in response to determining that the first webserver is not in communication with the network, routing, by the second GTM server, the second traffic to the fourth virtual machine of the second webserver to evaluate the second version of the application for deployment.

13. The method of claim 10, further comprising:

determining, by the first GTM server, whether the first data center is in communication with a network; and in response to determining that the first data center is not in communication with the network, routing, by the first GTM server, the first traffic to a corresponding webserver in a second data center.

14. The method of claim 10, further comprising:

determining, by the first GTM server, whether the first data center is in communication with a network;

in response to determining that the first data center is not in communication with the network, routing, by the first GTM server, the first traffic to a corresponding webserver in a second data center;

determining, by the second GTM server, whether the first data center is in communication with the network; and in response to determining that the first data center is not in communication with the network, routing, by the second GTM server, the second traffic to a corresponding webserver in the second data center.

15. A non-transitory computer-readable medium storing instructions that when executed by one or more processor causes the one or more processors to:

receive a first traffic from a first communication equipment to access a first version of an application, wherein the first version of the application runs in a first virtual machine of a first webserver;

receive a second traffic from a second communication equipment to evaluate a second version of the application for deployment, wherein the second version of the application is stored in a second virtual machine of the first webserver;

route the first traffic to the first virtual machine of the first webserver to access the first version of the application;

route the second traffic to the second virtual machine of the first webserver, wherein the second virtual machine is configured to evaluate the second version of the application for a deployment;

receive a notification from the first webserver, the notification indicating that the second version of the application passes an evaluation with the deployment on the second virtual machine;

route the first traffic to the second virtual machine of the first webserver to access the second version of the application; and route the second traffic to the first virtual machine of the first webserver, wherein the notification is configured to simultaneously trigger a first global traffic management (GTM) server to route the first traffic to the second virtual machine and trigger a second GTM server to route the second traffic to the first virtual machine.

16. The non-transitory computer-readable medium of claim 15, wherein the first webserver is located in a first data center, the first data center further comprising a second webserver;

wherein the second webserver comprises a third virtual machine and a fourth virtual machine;

wherein the third virtual machine is configured to run the first version of the application; and wherein the fourth virtual machine is configured to evaluate the second version of the application.

17. The non-transitory computer-readable medium of claim 16, wherein the instructions further cause the one or more processors to:

determine whether the first webserver is in communication with a network; and in response to determining that the first webserver is not in communication with the network, route the first traffic to the third virtual machine of the second webserver to access the first version of the application.

18. The non-transitory computer-readable medium of claim 16, wherein the instructions further cause the one or more processors to:

determine whether the first webserver is in communication with a network; and in response to determining that the first webserver is not in communication with the network, route the second traffic to the fourth virtual machine of the second webserver to evaluate the second version of the application for deployment.

19. The non-transitory computer-readable medium of claim 16, wherein the instructions further cause the one or more processors to:

determine whether the first data center is in communication with a network; and in response to determining that the first data center is not in communication with the network, route the first traffic to a corresponding webserver in a second data center.

20. The non-transitory computer-readable medium of claim 16, wherein the instructions further cause the one or more processors to:

determine whether the first data center is in communication with a network;

in response to determining that the first data center is not in communication with the network, route the first traffic to a corresponding webserver in a second data center;

determine whether the first data center is in communication with the network; and in response to determining that the first data center is not in communication with the network, route the second traffic to a corresponding webserver in the second data center.

* * * * *